(No Model.)

J. E. DUNCAN.
WINDMILL.

No. 415,904. Patented Nov. 26, 1889.

WITNESSES:
Phil C. Dieterich
C. Sedgwick

INVENTOR
J. E. Duncan
BY
Munn & Co.
ATTORNEY

UNITED STATES PATENT OFFICE.

JAMES E. DUNCAN, OF FORMAN, ASSIGNOR TO HIMSELF, AND MARY ELIZABETH SMITH, OF HARLEM, (DAKOTA TERRITORY,) NORTH DAKOTA.

WINDMILL.

SPECIFICATION forming part of Letters Patent No. 415,904, dated November 26, 1889.

Application filed April 11, 1889. Serial No. 306,881. (No model.)

*To all whom it may concern:*

Be it known that I, JAMES E. DUNCAN, of Forman, in the county of Sargent and Territory of Dakota, have invented a new and Improved Windmill, of which the following is a full, clear, and exact description.

The object of the invention is to provide a new and improved windmill which is simple and durable in construction and very effective in operation.

The invention consists of a horizontal wind-wheel turning loosely in an aperture formed in the bottom of a casing mounted to turn and provided with an adjustable inclined cover for guiding the wind to the wind-wheel.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
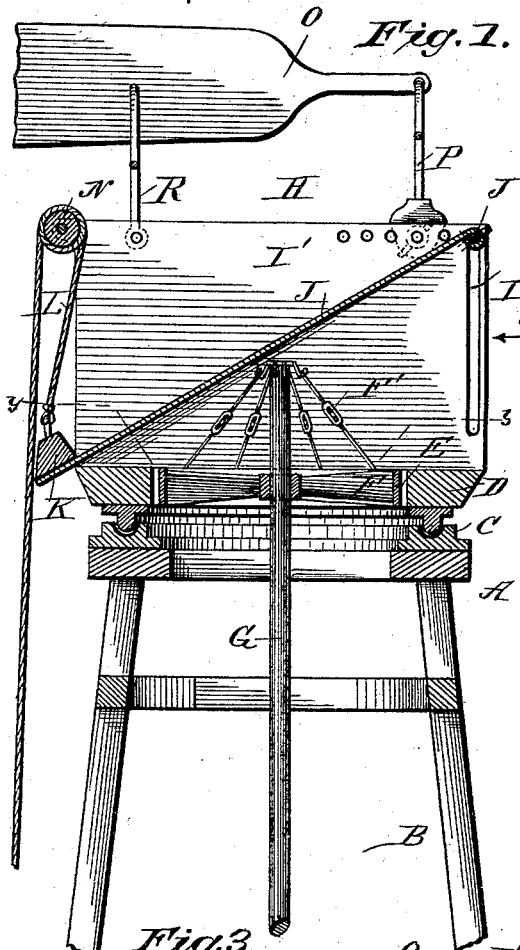
Figure 2:
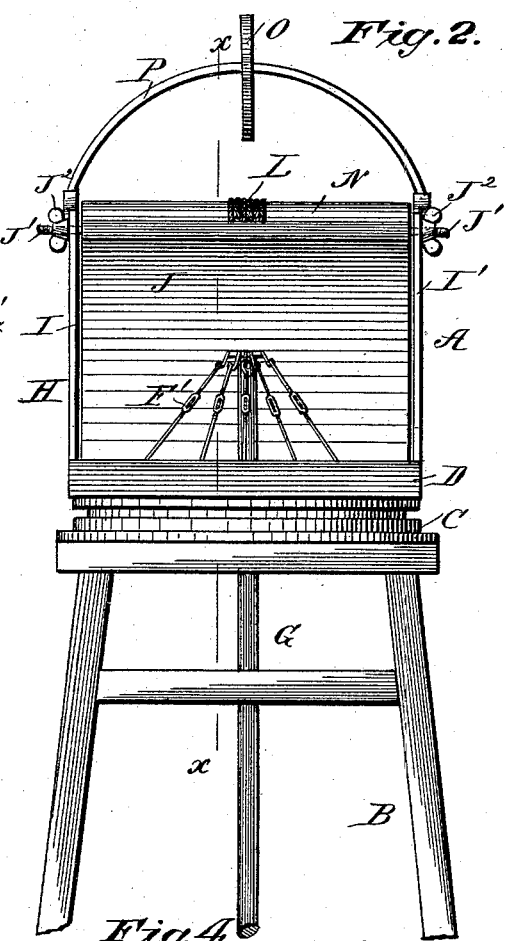
Figure 3:
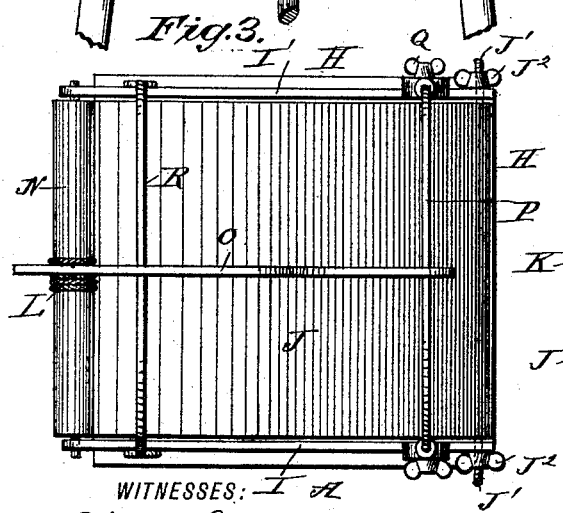
Figure 4:
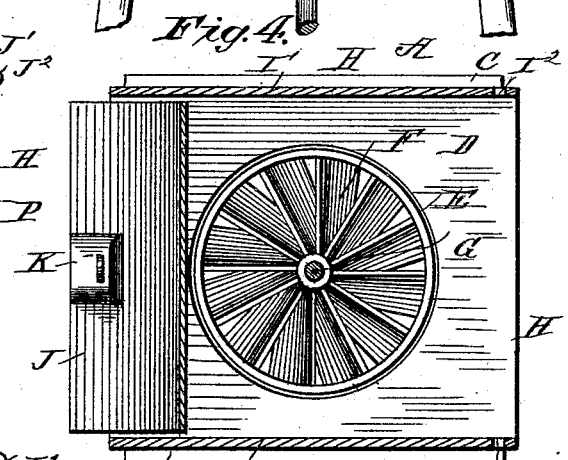

Figure 1 is a sectional side elevation of the improvement on the line $x\ x$ of Fig. 2. Fig. 2 is a front view of the same. Fig. 3 is a plan view of the same, and Fig. 4 is a sectional plan view of the same on the line $y\ y$ of Fig. 1.

The improved windmill A is provided with a suitable tower B, on the top of which is secured a circular track C, on which is mounted to turn the bottom D of a casing H. In the middle of the bottom D is formed a circular opening E, into which fits loosely the horizontally-extending wind-wheel F, secured on a wind-wheel shaft G, extending downward in the middle of the tower B and connected in the usual manner with the machinery to be driven. The shaft G extends slightly above the wind-wheel F, and has its upper end connected by stays F' with the rim of the wind-wheel, so as to strengthen the same.

The casing H is provided with the sides I and I', secured on the bottom D, and is also provided with a cover J, held between the sides in an inclined position. The cover J may be straight or curved, as desired. The upper end of the cover J is fulcrumed on a rod J', extending transversely through vertical slots $I^2$, formed in the sides I and I', said rod being adapted to be secured in the said sides by winged nuts $J^2$, screwing on the outer threaded ends of the rod J'. By loosening the winged nuts $J^2$ the rod J' can be raised or lowered in the slots $I^2$ of the sides I and I', so as to adjust the cover J at any desired angle between the sides I and I'.

The lower end of the cover J rests loosely on the rear end of the bottom D and its lower end is provided with a weight K, to which is secured one end of a rope L, wound around a drum N, extending transversely and mounted to turn in suitable bearings formed in the sides I and I'. The other end of the rope L extends down to the ground and permits the operator to raise or lower the lower end of the cover J whenever desired.

On top of the casing H is held a vane O, extending in line with the sides I and I' of the said casing. The vane O is supported at its front end in the middle of a curved rod P, secured by bolts Q to the sides I and I' of the casing H. Said bolts Q are adapted to fit in apertures arranged in a row near the top edges of the sides I and I' of the casing H, so as to adjust the vane. The rear end of the vane O is supported in the middle of a curved rod R, pivoted at its ends to the sides I and I' of the casing H. When the curved rod P is moved forward or backward on the sides I and I', the rod R swings and raises or lowers the vane O.

The operation is as follows: As the casing H is mounted to turn on the track C on the tower B, the vane O will always hold the casing in such a position that the wind will enter the casing in the direction of the arrow $a'$— that is, in line with the sides I and I'. The wind passing between the sides strikes against the inclined cover J, which deflects the wind downward onto the wind-wheel F, so that the latter is turned, and thereby imparts a rotary motion to its shaft G and the machinery to be driven. The wind can be deflected by the cover J at any desired angle by adjusting the said cover J, up or down at its upper end in the manner previously described. When the wind travels at a very high rate of speed, the pressure of the wind raises the lower weighted end of the cover J, so that part of the wind can pass out between the bottom D and the rear ends of the sides I and I', and only a portion of the wind is deflected and utilized to drive the wind-wheel F, so that the latter, even in a gale, travels at a normal rate of speed. When the operator desires to stop the wind-wheel, he pulls on the rope L, so that the lower end of the cover J is raised and the wind can pass freely through the casing H without being deflected onto the wheel F, and the latter consequently ceases to rotate.

Having thus fully described my invention, I claim as new and desire to secure by Letters Patent—

1. In a windmill, the combination, with a wind-wheel mounted to turn horizontally, of a casing mounted to turn on top of the tower, and consisting of an apertured bottom into which fits the said wind-wheel, sides erected on the said bottom, and an inclined cover pivoted between the said sides, substantially as shown and described.

2. In a windmill, the combination, with a wind-wheel mounted to turn horizontally, of a casing mounted to turn on top of the tower, and consisting of an apertured bottom into which fits the said wind-wheel, sides erected on the said bottom, and an inclined cover held between the said sides and pivoted at its upper end to said sides and provided at its lower end with a weight, substantially as shown and described.

3. In a windmill, the combination, with a wind-wheel mounted to turn horizontally, of a casing mounted to turn on top of the tower, and consisting of an apertured bottom into which fits the said wind-wheel, sides erected on the said bottom, an inclined cover held between the said sides and pivoted at its upper end to the said sides and provided at its lower end with a weight, a rope connected with the lower weighted end of the said cover, and a drum mounted to turn in the said sides and on which winds the said rope, the end of the latter extending downward to the ground, substantially as shown and described.

4. In a windmill, the combination, with a wind-wheel mounted to turn horizontally, of a casing provided with sides and a bottom having a circular aperture into which fits the said wheel, a tower provided on top with a circular track on which is mounted to turn the said bottom, and an adjustable inclined cover extending between the said sides to guide the wind to the said wheel, substantially as shown and described.

5. In a windmill, the combination, with a wind-wheel mounted to turn horizontally, of a casing provided with sides and a bottom having a circular aperture into which fits the said wheel, a tower provided on top with a circular track on which is mounted to turn the said bottom, an inclined cover extending between the said sides to guide the wind to the said wheel, and a vane held adjustably on top of the said casing and extending parallel with the said sides, substantially as shown and described.

6. In a windmill, the combination, with a casing, of a curved rod adjustably secured to the sides of the casing, a second curved rod pivoted to the sides of the casing in rear of the first-named rod, and a vane carried by said rods, substantially as and for the purpose specified.

JAMES E. DUNCAN.

Witnesses:
 SIMEON MILLS,
 JAMES B. SMITH.